US008929270B2

(12) United States Patent
Park et al.

(10) Patent No.: US 8,929,270 B2
(45) Date of Patent: Jan. 6, 2015

(54) COORDINATED TRANSMISSION RATE AND CHANNEL SCHEDULING FOR WIRELESS MULTICAST AND BROADCAST

(71) Applicant: QUALCOMM Incorporated, San Diego, CA (US)

(72) Inventors: Vincent Park, Budd Lake, NJ (US); Junyi Li, Chester, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 13/663,417

(22) Filed: Oct. 29, 2012

(65) Prior Publication Data

US 2014/0119262 A1    May 1, 2014

(51) Int. Cl.
  *H04W 4/06*  (2009.01)
  *H04W 72/14*  (2009.01)

(52) U.S. Cl.
  CPC .............. *H04W 4/06* (2013.01); *H04W 72/14* (2013.01)
  USPC ........................................................ 370/312

(58) Field of Classification Search
  CPC ....... H04W 4/06; H04W 28/18; H04W 48/06; H04W 48/04; H04W 72/14
  USPC ........................................................ 370/312
  See application file for complete search history.

(56) References Cited

U.S. PATENT DOCUMENTS

| 7,477,627 | B2 | 1/2009 | Ginzburg et al. |
| 7,684,343 | B2 | 3/2010 | Vasil'evich et al. |
| 2007/0172068 | A1 * | 7/2007 | Herrmann ..................... 380/278 |
| 2007/0233889 | A1 | 10/2007 | Guo et al. |
| 2008/0004054 | A1 * | 1/2008 | Barbaresi et al. ............. 455/466 |
| 2008/0089354 | A1 * | 4/2008 | Yoon et al. ..................... 370/432 |
| 2008/0151860 | A1 | 6/2008 | Sakoda et al. |

(Continued)

FOREIGN PATENT DOCUMENTS

| EP | 1521394 A1 | 4/2005 |
| WO | 2004032552 A1 | 4/2004 |
| WO | 2009023741 | 2/2009 |

OTHER PUBLICATIONS

Garmonov et al., "Joint Fragment Size and Transmission Rate Optimization for Request-to-Send/Clear-to-send Mechanism of IEEE 802.11b Distributed Coordination Function," IEEE 16th International Symposium on Personal, Indoor and Mobile Radio Communications, pp. 1453-1457, Sep. 2005.

(Continued)

*Primary Examiner* — Min Jung
(74) *Attorney, Agent, or Firm* — James K. O'Hare

(57) ABSTRACT

A method, an apparatus, and a computer program product for wireless communication are provided. The apparatus receives indication of a transmission scheme for decoding multicast/broadcast data transmitted from a sender, receives a reservation signal for the multicast/broadcast data from the sender, determines whether the receiver is capable of decoding the multicast/broadcast data at the indicated transmission scheme, and transmits a confirmation signal for the multicast/broadcast data to the sender after determining that the receiver is capable of decoding the multicast/broadcast data at the indicated transmission scheme. The apparatus receives the multicast/broadcast data according to the transmission scheme after the confirmation signal is transmitted. Alternatively, the apparatus suppresses transmission of the confirmation signal when it is determined that the receiver is not capable of decoding the multicast/broadcast data at the indicated transmission scheme.

32 Claims, 10 Drawing Sheets

(56) References Cited

U.S. PATENT DOCUMENTS

| | | |
|---|---|---|
| 2010/0246549 A1 | 9/2010 | Zhang et al. |
| 2013/0176864 A1* | 7/2013 | Quan et al. ................. 370/245 |
| 2013/0295921 A1* | 11/2013 | Bhargava et al. .......... 455/426.1 |
| 2013/0322279 A1* | 12/2013 | Chincholi et al. ............ 370/252 |
| 2014/0057670 A1* | 2/2014 | Lim et al. ..................... 455/509 |
| 2014/0073289 A1* | 3/2014 | Velasco ........................ 455/411 |

OTHER PUBLICATIONS

International Search Report and Written Opinion—PCT/US2013/066333—ISA/EPO—Jan. 31, 2014.

\* cited by examiner

COORDINATED TRANSMISSION RATE AND CHANNEL SCHEDULING FOR WIRELESS MULTICAST AND BROADCAST

BACKGROUND

1. Field

The present disclosure relates generally to communication systems, and more particularly, to integrating transmission rate selection and a channel scheduling process for multicast and broadcast traffic.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives indication of a transmission scheme for decoding multicast/broadcast data transmitted from a sender, receives a reservation signal for the multicast/broadcast data from the sender, determines whether the receiver is capable of decoding the multicast/broadcast data at the indicated transmission scheme, and transmits a confirmation signal for the multicast/broadcast data to the sender after determining that the receiver is capable of decoding the multicast/broadcast data at the indicated transmission scheme. The apparatus receives the multicast/broadcast data according to the transmission scheme when the confirmation signal is transmitted. Alternatively, the apparatus suppresses transmission of the confirmation signal when it is determined that the receiver is not capable of decoding the multicast/broadcast data at the indicated transmission scheme.

In another aspect, the apparatus receives a first indication of a first transmission scheme for decoding first multicast/broadcast data transmitted from a first sender, wherein a receiver within a first predetermined region of the first sender is capable of decoding the multicast/broadcast data at the first transmission scheme, receives a second indication of a second transmission scheme for decoding second multicast/broadcast data transmitted from a second sender, wherein the receiver within a second predetermined region of the second sender is capable of decoding the multicast/broadcast data at the second transmission scheme, wherein the first predetermined region overlaps with the second predetermined region, receives a first reservation signal for the first multicast/broadcast data from the first sender, receives a second reservation signal for the second multicast/broadcast data from the second sender, determines a first signal-to-interference-plus-noise ratio (SINR) based on the indicated first transmission scheme, determines a second SINR based on the indicated second transmission scheme, compares the first SINR to the second SINR and determines a desire for decoding the first multicast/broadcast data at the first indicated transmission scheme or the second multicast/broadcast data at the second indicated transmission scheme based on the comparison, and transmits at least one confirmation signal for at least one of the first multicast/broadcast data to the first sender or the second multicast/broadcast data to the second sender when the desire for decoding the first multicast/broadcast data or the second multicast/broadcast data is determined. The apparatus further receives at least one of the first multicast/broadcast data according to the first indicated transmission scheme or the second multicast/broadcast data according to the second indicated transmission scheme when the at least one confirmation signal is transmitted. Alternatively, the apparatus may suppress transmission of the at least one confirmation signal for the first multicast/broadcast data when it is determined that the apparatus does not desire decoding the first multicast/broadcast data at the indicated first transmission scheme, and/or suppress transmission of the at least one confirmation signal for the second multicast/broadcast data when it is determined that the apparatus does not desire decoding the second multicast/broadcast data at the indicated second transmission scheme.

DETAILED DESCRIPTION

Figure 1:
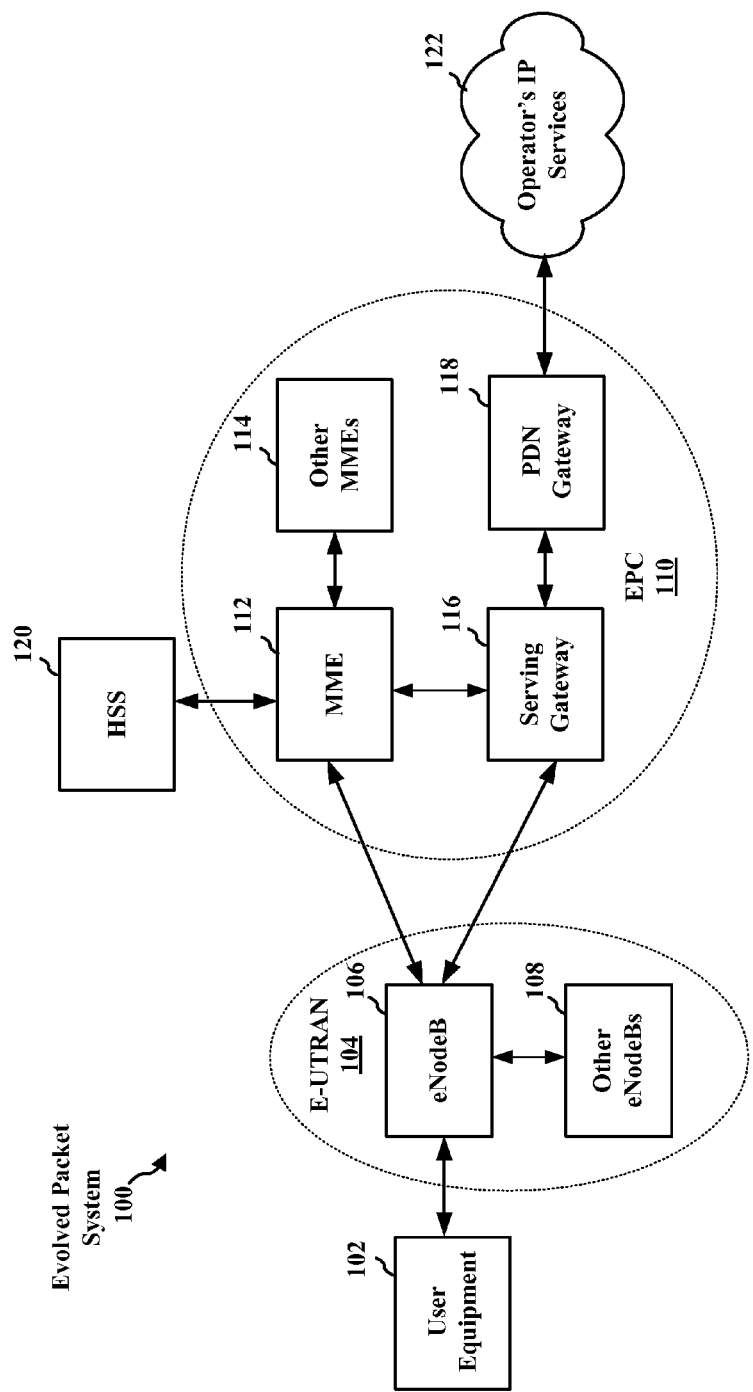
FIG. 1 is a diagram illustrating an example of a network architecture, according to one embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 104 includes the evolved Node B (eNB) 106 and other eNBs 108. The eNB 106 provides user and control plane protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet computer, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. User IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an Intranet, an IP Multimedia Subsystem (IMS), and a PS Streaming Service (PSS).

The modulation and multiple access scheme employed by an access network may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 2:
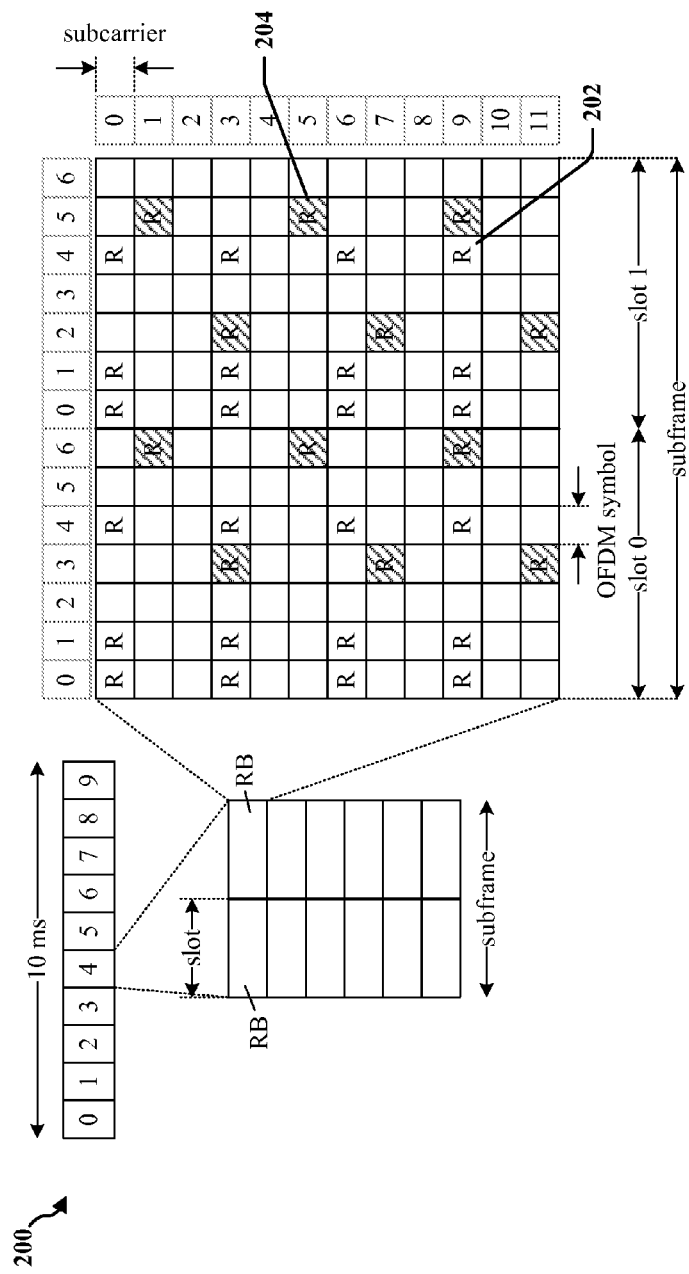
FIG. 2 is a diagram illustrating an example of a DL frame structure in LTE, according to one embodiment.

FIG. 2 is a diagram 200 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements or tone-symbols. In LTE, a resource block contains 12 consecutive subcarriers (tones) in the frequency domain and, for a normal cyclic prefix in each OFDM symbol, 7 consecutive OFDM symbols in the time domain, or 84 resource elements or tone-symbols. For an extended cyclic prefix, a resource block contains 6 consecutive OFDM symbols in the time domain and has 72 resource elements or tone-symbols. Some of the resource elements (tone-symbols), as indicated as R 202, 204, include DL reference signals (DL-RS). The DL-RS include Cell-specific RS (CRS) (also sometimes called common RS) 202 and UE-specific RS (UE-RS) 204. UE-RS 204 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 3:
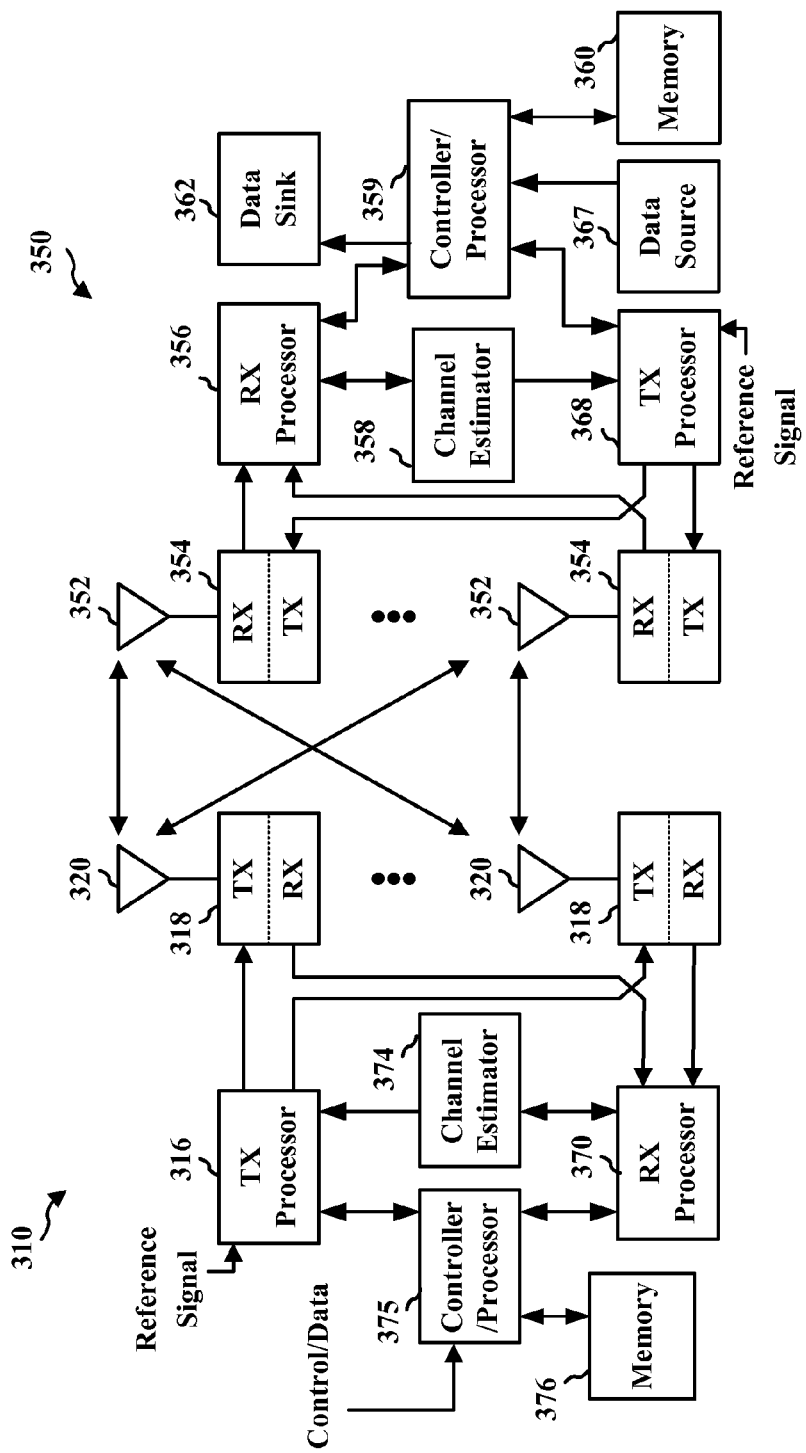
FIG. 3 is a diagram illustrating an example of an evolved Node B and user equipment in an access network, according to one embodiment.

FIG. 3 is a block diagram of an eNB 310 in communication with a UE 350 in an access network. In the DL, upper layer packets from the core network are provided to a controller/processor 375. The controller/processor 375 implements the functionality of an L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for an L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
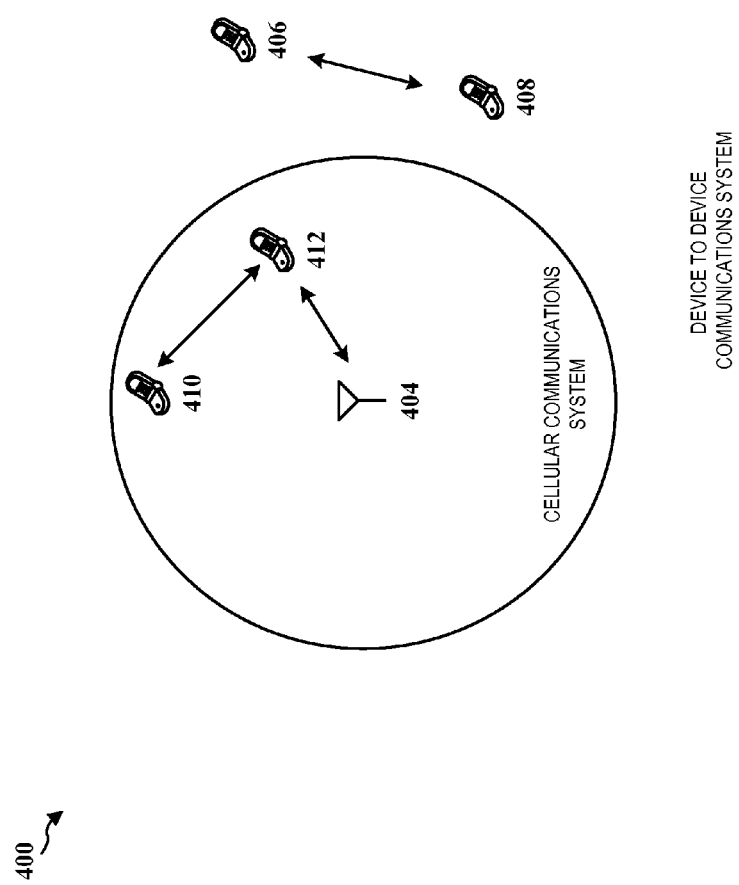
FIG. 4 is a diagram of an exemplary device-to-device (D2D) communications system, according to one embodiment.

FIG. 4 is a diagram 400 of an exemplary device-to-device (D2D) communications system. The device-to-device communications system 400 includes a plurality of wireless devices 406, 408, 410, 412. The device-to-device communications system 400 may overlap with a cellular communications system, such as for example, a wireless wide area network (WWAN). Some of the wireless devices 406, 408, 410, 412 may communicate together in device-to-device communication, some may communicate with the base station 404, and some may do both. Device-to-device communication may be effectuated by directly transferring signals between the wireless devices. Thus, the signals need not traverse through an access node (e.g., a base station) or centrally managed network. Device-to-device communication may provide short range, high data rate communication (e.g., within a home or office type setting). As shown in FIG. 4, the wireless devices 406, 408 are in device-to-device communication and the wireless devices 410, 412 are in device-to-device communication. The wireless device 412 is also communicating with the base station 404.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

In an aspect, a device radio can transmit at different data transmission schemes (e.g., rates) to neighbor devices. Such multi-scheme transmission capability allows a sender to deliver to a different set of neighbors with different latency or different data load, due to different pathloss characteristics.

Usually, channel scheduling and rate selection are two separate processes. For example, in an IEEE 802.11 MAC unicast system, sender and receiver nodes may negotiate channel access via request to send (RTS)/clear to send (CTS) scheduling. The nodes may then use a type of heuristic rate adaptation scheme to settle on a rate via multiple rounds of iteration. In a FlashLinQ system, two peer nodes negotiate channel access via connection scheduling to first obtain a channel timeslot. Thereafter, a rate selection procedure is performed to determine the actual transmission rate.

Typically, multi-scheme capability is not utilized in the channel scheduling processes for multicast/broadcast traffic in the above-mentioned systems. Instead, multicast and broadcast traffic are usually transmitted with a predetermined transmission scheme (e.g., data rate). For example, an IEEE 802.11 broadcast may be sent at a basic rate which can maximize transmission range, without having an RTS/CTS-like channel scheduling stage. However, such a mechanism may not be cost-effective for local multicast and broadcast traffic. The present disclosure coordinates channel scheduling for multicast traffic with channel rate specification so that differing distances can be reached and differing performance may be achieved, respectively, for a different set of local receivers.

In an aspect, a broadcast transmission may refer to transmitting information to be received by all devices on a network. A multicast transmission may refer to transmitting information to be received by a specific group of devices on the network. Hence, a multicast/broadcast data transmission may refer to a signal or message that is transmitted to a plurality of endpoints. In particular, the multicast/broadcast data transmission may be transmitted once to be received by a plurality of receivers at, or near, the same time.

In an aspect, the present disclosure provides for integrating transmission rate (or transmission scheme) selection and a channel scheduling process for multicast and broadcast traffic. The transmission rate (scheme) may be indicated by the sender prior to, or during, channel scheduling signaling and used by the receivers during channel scheduling signaling. Thus, only the receivers located in an "achievable region" of the indicated rate may respond to a scheduling request. For the receivers that are unable to receive at the indicated rate, the receivers do not respond positively to the sender, but may still be aware of the scheduled transmission.

By integrating transmission rate selection and a channel scheduling process for multicast/broadcast traffic, certain benefits may be realized. For example, one benefit includes the sender gaining a more accurate picture of a transmitter-receiver(s) relationship for an ensuing data transmission. This may also help the sender in making corresponding preparations for an ARQ process and a next round of scheduling.

Another benefit includes the receivers being able to evaluate the likelihood of successfully decoding a packet based on the indicated transmission rate and improve spatial reuse by appropriately responding during channel scheduling signaling. When a receiver receives multiple requests at the same time, the receiver may calculate the impact of interference and decide whether it is able to receive one or more multicast/broadcast transmissions at a certain rate.

The above-described mechanism may be applied to, but not limited to, the following examples. In one example, the sender may need to choose only a subset of receivers to receive multicast/broadcast traffic due to QoS requirements of the ensuing traffic. Thus, the sender does not want to over-reserve channel resources for the nodes which cannot meet the requirement. In another example, the sender may need to find the best rate to distribute data to a group of receivers. Thus, the sender may invoke the above-described request/response procedure on-the-fly to determine an acceptable rate for a proper set of receivers.

In an aspect, the transmission rate specification may be performed via dynamic scheduling on a per-packet basis, or be accomplished by a process prior to the start of a traffic session.

Figure 5:
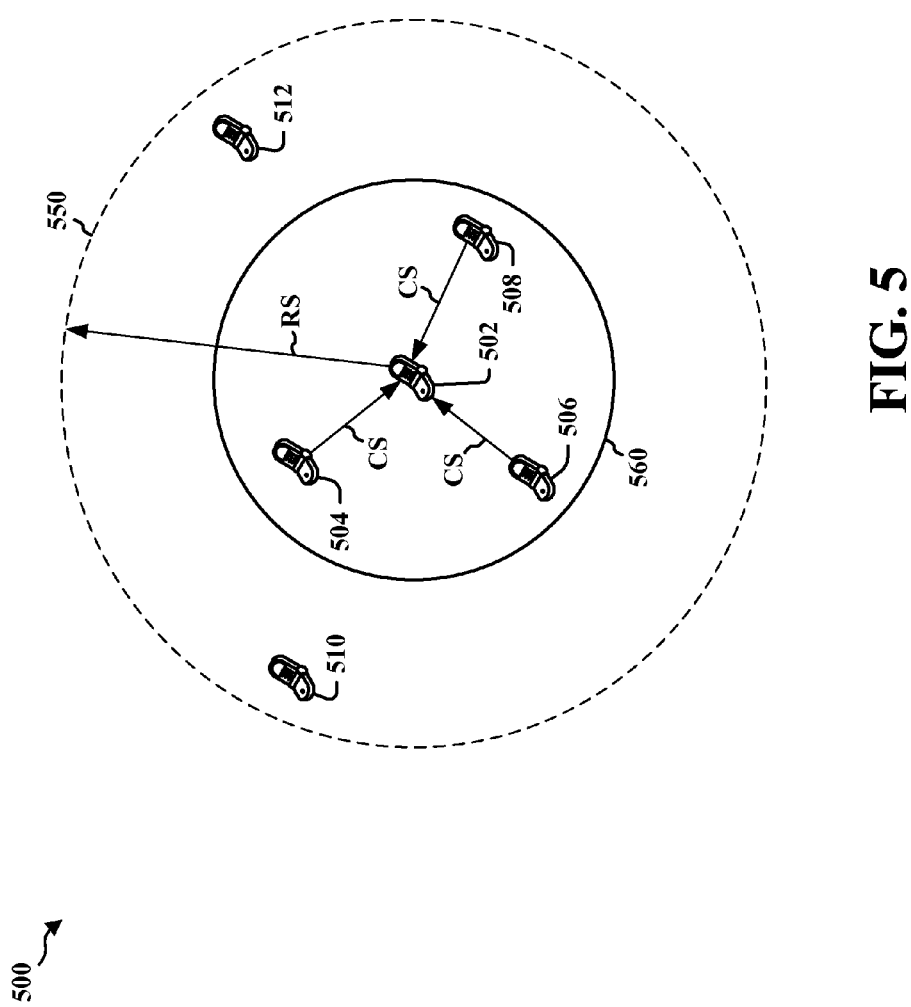
FIG. 5 is a diagram illustrating integration of transmission rate selection and channel scheduling for multicast/broadcast traffic, according to one embodiment.

FIG. 5 is a diagram 500 illustrating integration of transmission rate selection and channel scheduling for multicast/broadcast traffic. Referring to FIG. 5, a sender 502 sends a reservation signal (RS) for scheduling a multicast/broadcast transmission. The reservation signal may be a request to send (RTS) message, for example. The reservation signal reaches all potential receivers (e.g., receivers 504, 506, 508, 510, 512) within a predetermined distance from the sender 502, indicated by the dotted circle 550. However, a corresponding data packet may be transmitted according to a transmission scheme (e.g., rate) that is only expected to be successfully decoded by receivers (e.g., receivers 504, 506, 508) within a shorter distance from the sender 502, indicated by the circle 560. Prior to the data transmission, the sender 502 may indicate the intended data transmission scheme either via out of band signaling, in the reservation signal, or in another signal transmitted to the receivers. Thus, only the receivers 504, 506, and 508, which are capable of successfully decoding the corresponding data packet (e.g., are within the shorter distance from the sender 502), may respond positively to the sender 502's scheduling request with a confirmation signal (CS) inviting the sender 502 to proceed with the data transmission. The confirmation signal may be a clear to send (CTS) message, for example. The receivers 510, 512, that are unable to successfully decode the corresponding data packet at the indicated transmission scheme do not respond positively to the sender 502's scheduling request. For example the receivers 510, 512 may suppress transmission of the CS. Regardless, the receivers 510, 512 may still be aware of the scheduled data transmission from the sender 502.

In an aspect, a receiver may belong to multiple multicast groups. In such a case, the receiver may receive more than one scheduling request for the same scheduling period. Accordingly, the receiver may consider the likelihood of receiving at least one of the transmissions subject to the coexistence of other interfering transmissions. If a signal-to-interference-plus-noise ratio (SINR) of a scheduling request is high enough to decode at the specified data rate, then the receiver may send a confirmation signal (e.g., CTS) to acknowledge the scheduling request.

Figure 6:
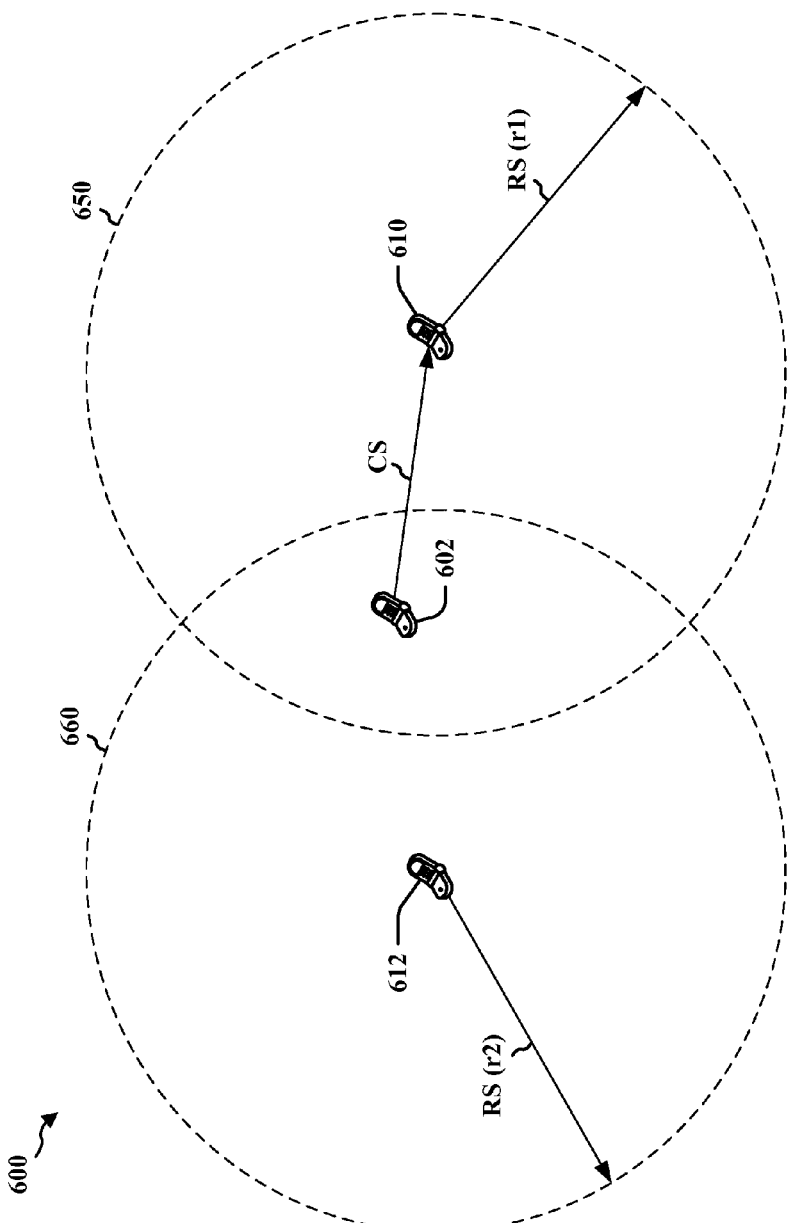
FIG. 6 is a diagram illustrating the handling of multiple scheduling requests received by a receiver, according to one embodiment.

FIG. 6 is a diagram 600 illustrating the handling of multiple scheduling requests received by a receiver. Referring to FIG. 6, a receiver 602 is in an overlapping reception area of two possible senders: first sender 610 and second sender 612. A reservation signal sent by the first sender 610 reaches all potential receivers within a predetermined distance from the first sender 610, indicated by the dotted circle 650. A reservation signal sent by the second sender 612 reaches all potential receivers within a predetermined distance from the second sender 612, indicated by the dotted circle 660. When the first sender 610 and the second sender 612 respectively send reservation signals RS (e.g., RTS) for scheduling multicast/broadcast data transmissions, the receiver 602 may hear both reservation signals. The receiver 602 may then evaluate a respective SINR for each data transmission based on a respective indicated rate from each sender, assuming the co-existence of both data transmissions.

In one example, in the presence of the data transmission from the second sender 612, the receiver 602 is able to decode the data transmission from the first sender 610 transmission at a rate r1. However, the receiver 602 is not able to decode the data transmission from the second sender 612 at a rate r2. Accordingly, the receiver 602 may only send a positive confirmation signal CS (e.g., CTS) to the first sender 610. Moreover, the receiver 602 may suppress transmission of a CS to the second sender 612. Thereafter, the receiver 602 may receive the data transmission from the first sender 610.

In another example, in the presence of the data transmission from the second sender 612, the receiver 602 is not able to decode the data transmission from the first sender 610 at the rate r1, but will be able to decode the data transmission from the second sender 612 at the rate r2. Accordingly, the receiver 602 may only send a positive confirmation signal CS (not shown) to the second sender 612. Also, the receiver 602 may suppress transmission of a CS to the first sender 610. The receiver 602 may then receive the data transmission from the second sender 612.

In a further example, in the presence of the data transmission from the second sender 612, the receiver 602 is able to decode both the data transmission from the first sender 610 at the rate r1 and the data transmission from the second sender 612 at the rate r2. However, the receiver 602 may further compare the SINR of the RS from the first sender 610 to the SINR of the RS from the second sender 612 to determine which data transmission is more desirable to decode. For example, the receiver 602 may choose to only decode the data transmission from the first sender 610 after determining that the SINR of the RS from the first sender 610 is greater than the SINR of the RS from the second sender 612. Accordingly, the receiver 602 may send a positive CS to the first sender 610 to acknowledge the first sender 610's scheduling request, and receive the corresponding data transmission.

In an aspect, the present disclosure relates to a transmitter selecting a transmission scheme (e.g., selected data rate) for sending a scheduling request (e.g., reservation signal) for multicast/broadcast packet access and including a desired transmission scheme (e.g., desired data rate) in the scheduling request. In one aspect, the selected transmission scheme for sending the scheduling request may be different from the desired transmission scheme included in the scheduling request. For example, the transmitter may deliver the scheduling request at a selected transmission scheme (e.g., selected data rate) that is lower than a desired transmission scheme (e.g., desired data rate) to increase the likelihood of the scheduling request being heard by all nodes residing within an achievable rate region of the desired data rate. A receiver within a neighborhood of the transmitter, and within the achievable rate region, hears the scheduling request at the lower data rate and evaluates the likelihood of receiving data at the desired data rate based on one or more scheduling requests for the same time period, to determine whether the receiver can accept or reject the scheduling request.

In another aspect, the selected transmission scheme for sending the scheduling request may be the same as the desired transmission scheme included in the scheduling request. As such, when the transmitter delivers the scheduling request according to the selected transmission scheme, the likelihood of the scheduling request being heard by all nodes within the achievable rate region of the desired transmission scheme is decreased. Receivers that cannot hear the scheduling request make no decision regarding the acceptance or rejection of the scheduling request. However, a receiver capable of hearing the scheduling request may evaluate the likelihood of receiving data at the desired transmission scheme. Based on the evaluation, the receiver may determine whether to accept or reject the scheduling request.

Figure 7:
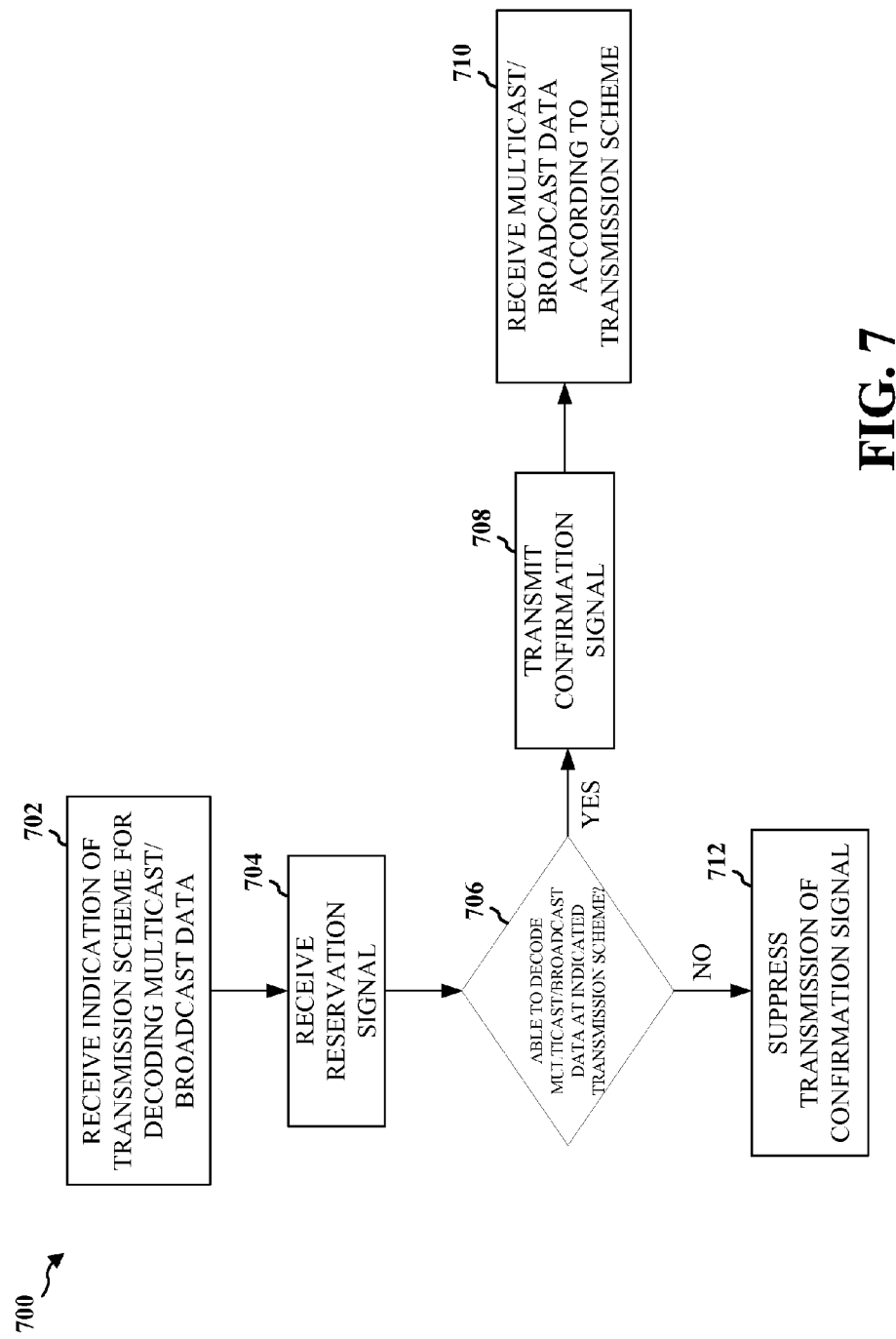
FIG. 7 is a flow chart of a method of wireless communication, according to one embodiment.

FIG. 7 is a flow chart 700 of a method of wireless communication. The method may be performed by a UE. At step 702, the UE receives indication of a transmission scheme for decoding multicast/broadcast data transmitted from a sender. The indication may be transmitted to the UE via a packet, previously communicated to the UE, or included in a reservation signal. The indication may also be implied by a resource tone-symbol. For example, certain transmission schemes may be tied to particular resource tone-symbols. As such, if an indication is sent on a first resource tone-symbol, the UE may infer that a first transmission scheme is employed. Similarly, if an indication is sent on a second resource tone-symbol, the UE may infer that a second transmission scheme is employed. The indication may be provided to the UE on a slow time scale (e.g., periodically or infrequently). Moreover, the indication may be valid for one or more reservation signals for scheduling the multicast/broadcast data from the sender. The indicated transmission scheme may be a transmission rate, a transmission power, a modulation scheme, and/or a coding scheme. Also, the reservation signal may be received according to a transmission scheme different from the indicated transmission scheme.

At step 704, the UE receives a reservation signal for scheduling the multicast/broadcast data transmission from the sender. At step 706, the UE determines whether the UE is capable of decoding the multicast/broadcast data at the indicated transmission scheme. This determination may include the UE determining whether a path loss between the sender and the UE supports the indicated transmission scheme.

At step 708, when the UE determines that it is capable of decoding the multicast/broadcast data at the indicated transmission scheme, the UE transmits a confirmation signal for acknowledging the multicast/broadcast data transmission to the sender. Thereafter, at step 710, the UE receives from the sender the multicast/broadcast data according to the transmission scheme. Alternatively, when the UE determines that it is not capable of decoding the multicast/broadcast data at the indicated transmission scheme, at step 712, the UE suppresses transmission of the confirmation signal for acknowledging the multicast/broadcast data transmission. In other words, the UE does not transmit a confirmation signal in response to the reservation signal.

Figure 8:
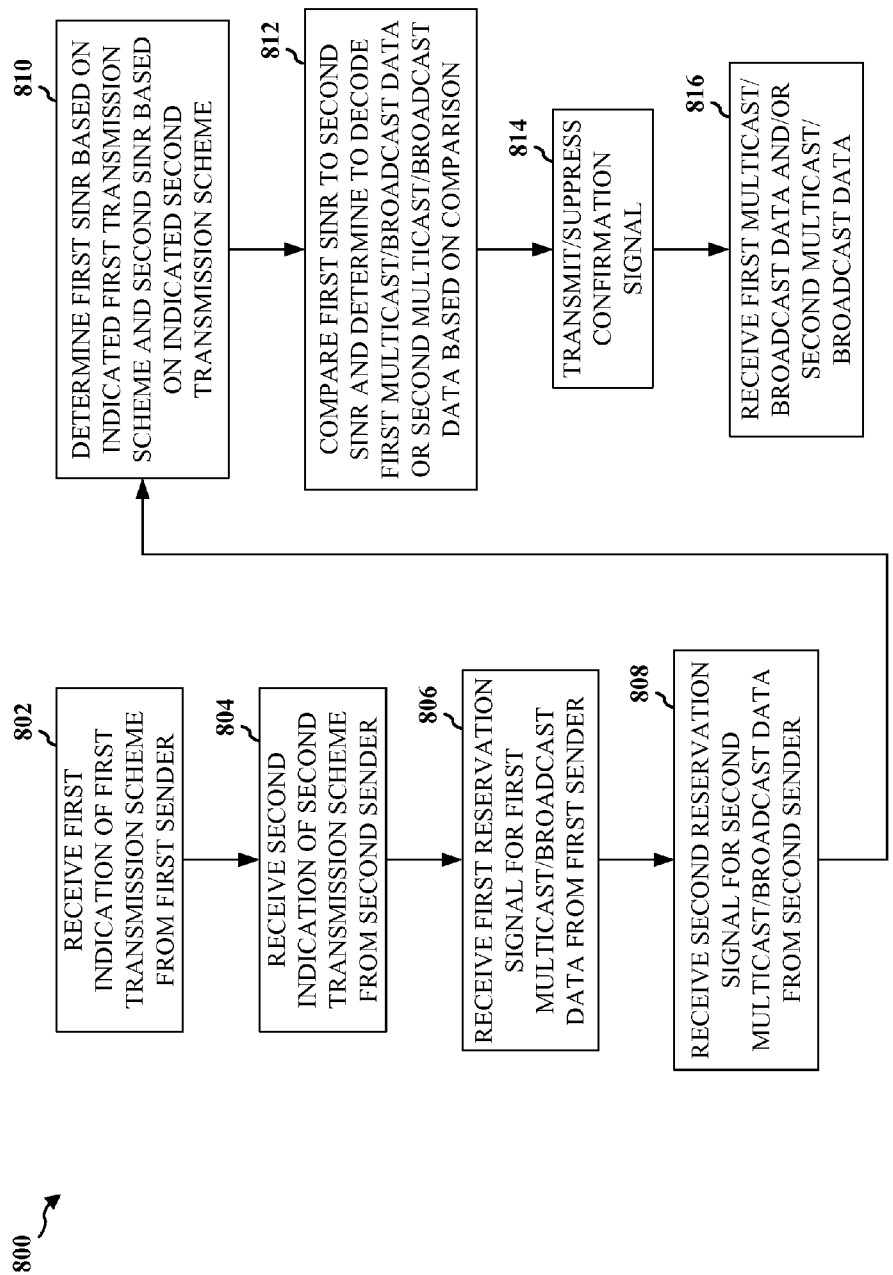
FIG. 8 is a flow chart of a method of wireless communication, according to one embodiment.

FIG. 8 is a flow chart 800 of a method of wireless communication. The method may be performed by a UE. At step 802, the UE receives a first indication of a first transmission scheme for decoding first multicast/broadcast data transmitted from a first sender. Here, the UE is within a first predetermined region of the first sender and is capable of decoding the multicast/broadcast data at the first transmission scheme.

At step 804, the UE receives a second indication of a second transmission scheme for decoding second multicast/broadcast data transmitted from a second sender. Here, the UE is also within a second predetermined region of the second sender and is capable of decoding the multicast/broadcast data at the second transmission scheme. The first predetermined region overlaps with the second predetermined region.

The indicated first transmission scheme and/or the second transmission scheme may be a transmission rate, a transmission power, a modulation scheme, and/or a coding scheme. The first indication and/or the second indication may be transmitted via a packet, implied by a resource tone-symbol, previously communicated to the UE, or included in a reservation signal. Moreover, the first indication and/or the second indication may be provided to the UE on a slow-time scale, and may be valid for one or more reservation signals for scheduling a multicast/broadcast data transmission.

At step 806, the UE receives a first reservation signal for scheduling the first multicast/broadcast data transmission from the first sender. At step 808, the UE receives a second reservation signal for scheduling the second multicast/broadcast data transmission from the second sender.

At step 810, the UE determines a first signal-to-interference-plus-noise ratio (SINR) based on the indicated first transmission scheme and a second SINR based on the indicated second transmission scheme. Thereafter, at step 812, the UE compares the first SINR to the second SINR and determines a desire for decoding the first multicast/broadcast data at the first indicated transmission scheme or the second multicast/broadcast data at the second indicated transmission scheme based on the comparison. For example, the UE may determine to only decode the data transmission from the first sender if the UE determines that the first SINR is greater than the second SINR. In an alternative example, the UE may determine to only decode the data transmission from the second sender if the UE determines that the second SINR is greater than the first SINR.

At step 814, the UE may transmit a confirmation signal to the first sender and/or the second sender for acknowledging the first multicast/broadcast data transmission or the second multicast/broadcast data transmission, respectively, when the desire for decoding the first multicast/broadcast data and/or the second multicast/broadcast data is determined. Thereafter, at step 816, the UE may receive the first multicast/broadcast data according to the first indicated transmission scheme and/or the second multicast/broadcast data according to the second indicated transmission scheme.

Alternatively and/or additionally, at step 814, the UE may suppress transmission of the confirmation signal for acknowledging the first multicast/broadcast data when it is determined that the UE does not desire decoding the first multicast/broadcast data at the indicated first transmission scheme. The UE may also suppress transmission of the at least one confirmation signal for acknowledging the second multicast/broadcast data when it is determined that the UE does not desire decoding the second multicast/broadcast data at the indicated second transmission scheme.

Figure 9:
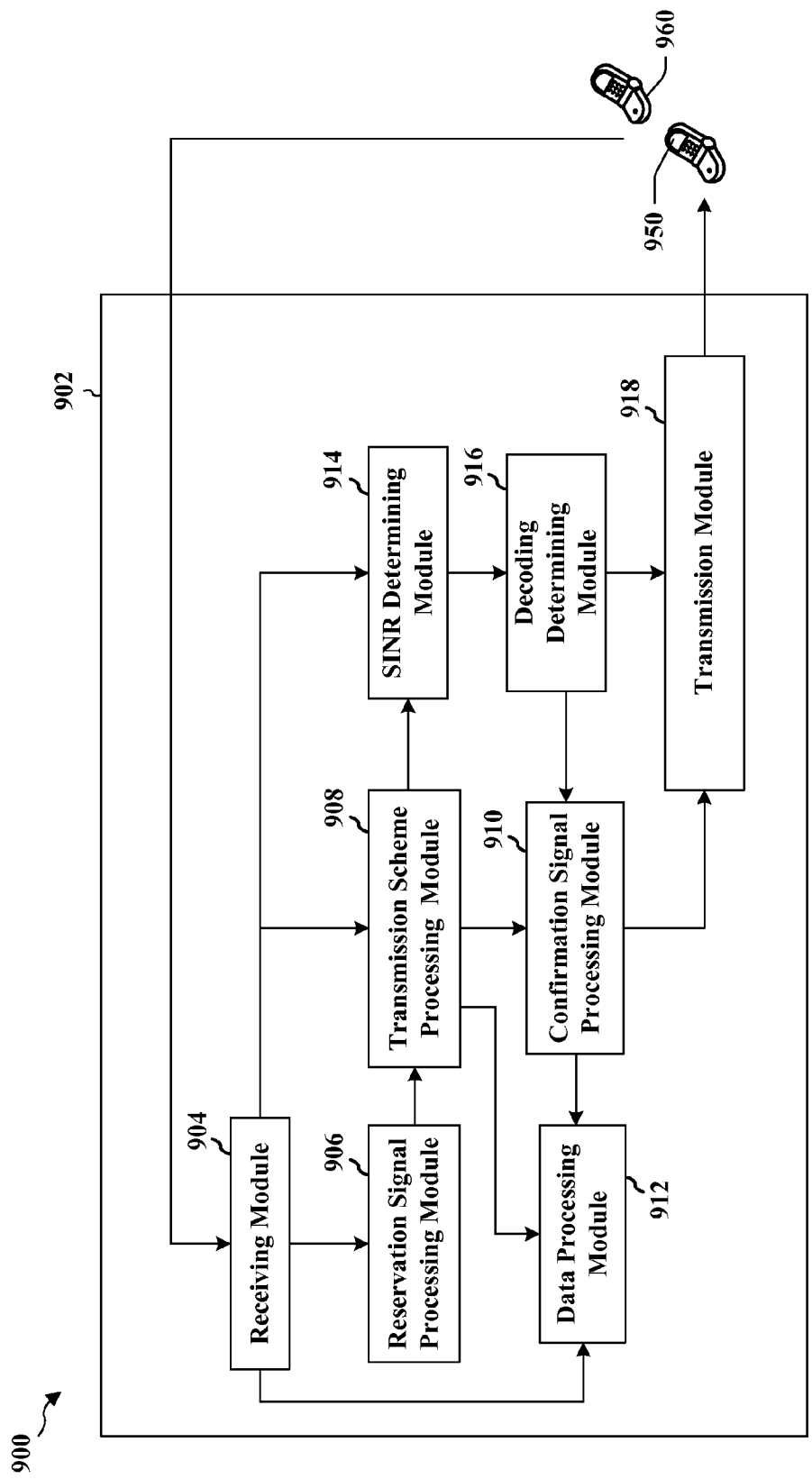
FIG. 9 is a conceptual data flow diagram illustrating the data flow between different modules/means/components in an exemplary apparatus, according to one embodiment.

FIG. 9 is a conceptual data flow diagram 900 illustrating the data flow between different modules/means/components in an exemplary apparatus 902. The apparatus may be a UE. The apparatus includes a receiving module 904, a reservation signal processing module 906, a transmission scheme processing module 908, a confirmation signal processing module 910, a data processing module 912, an SINR determining module 914, a decoding determining module 916, and a transmission module 918.

The transmission scheme processing module 908 receives (via the receiving module 904) indication of a transmission scheme for decoding multicast/broadcast data transmitted from a sender 950. The indication may be transmitted to the apparatus 902 via a packet, implied by a resource tone-symbol, previously communicated to the apparatus 902, or included in a reservation signal. The indication may be provided to the apparatus 902 on a slow-time scale. Moreover, the indication may be valid for one or more reservation signals for scheduling the multicast/broadcast data from the sender 950. The indicated transmission scheme may be a transmission rate, a transmission power, a modulation scheme, and/or a coding scheme.

The reservation signal processing module 906 receives (via the receiving module 904) a reservation signal for scheduling the multicast/broadcast data transmission from the sender 950. The transmission scheme processing module 908 determines whether the apparatus 902 is capable of decoding the multicast/broadcast data at the indicated transmission scheme. This determination may include the transmission scheme processing module 908 determining whether a path loss between the sender 950 and the apparatus 902 supports the indicated transmission scheme.

When the transmission scheme processing module 908 determines that it is capable of decoding the multicast/broadcast data at the indicated transmission scheme, the confirmation signal processing module 910 transmits (via the transmission module 918) a confirmation signal for acknowledging the multicast/broadcast data transmission to the sender 950. Thereafter, the data processing module 912 receives (via the receiving module 904) from the sender 950 the multicast/broadcast data according to the transmission scheme. Alternatively, when the transmission scheme processing module 908 determines that it is not capable of decoding the multicast/broadcast data at the indicated transmission scheme, the confirmation signal processing module 910 suppresses transmission of the confirmation signal for acknowledging the multicast/broadcast data transmission.

In an aspect, the transmission scheme processing module 908 receives (via the receiving module 904) a first indication of a first transmission scheme for decoding first multicast/broadcast data transmitted from a first sender 950. Here, the apparatus 902 is within a first predetermined region of the first sender 950 and is capable of decoding the multicast/broadcast data at the first transmission scheme.

Moreover, the transmission scheme processing module 908 receives (via the receiving module 904) a second indication of a second transmission scheme for decoding second multicast/broadcast data transmitted from a second sender 960. Here, the apparatus 902 is also within a second predetermined region of the second sender 960 and is capable of decoding the multicast/broadcast data at the second transmission scheme. The first predetermined region overlaps with the second predetermined region.

The indicated first transmission scheme and/or the second transmission scheme may be a transmission rate, a transmission power, a modulation scheme, and/or a coding scheme. The first indication and/or the second indication may be transmitted via a packet, implied by a resource tone-symbol, previously communicated to the apparatus 902, or included in a reservation signal. Moreover, the first indication and/or the second indication may be provided to the apparatus 902 on a slow-time scale, and may be valid for one or more reservation signals for scheduling a multicast/broadcast data transmission.

The reservation signal processing module 906 receives a first reservation signal for scheduling the first multicast/broadcast data transmission from the first sender 950. The reservation signal processing module 906 also receives a second reservation signal for scheduling the second multicast/broadcast data transmission from the second sender 960.

The SINR determining module 914 determines a first signal-to-interference-plus-noise ratio (SINR) based on the indicated first transmission scheme and a second SINR based on the indicated second transmission scheme. Thereafter, the decoding determining module 916 compares the first SINR to the second SINR and determines a desire for decoding the first multicast/broadcast data at the first indicated transmission scheme or the second multicast/broadcast data at the second indicated transmission scheme based on the comparison. For example, the decoding determining module 916 may determine to only decode the data transmission from the first sender if it is determined that the first SINR is greater than the second SINR. In an alternative example, the decoding determining module 916 may determine to only decode the data transmission from the second sender if it is determined that the second SINR is greater than the first SINR.

The confirmation signal processing module 910 may transmit (via the transmission module 918) a confirmation signal to the first sender 950 and/or the second sender 960 for acknowledging the first multicast/broadcast data transmission or the second multicast/broadcast data transmission, respectively, when the decoding determining module 916 determines the desire for decoding the first multicast/broadcast data and/or the second multicast/broadcast data. Thereafter, the data processing module 912 may receive (via the receiving module 912) the first multicast/broadcast data according to the first indicated transmission scheme and/or the second multicast/broadcast data according to the second indicated transmission scheme.

Alternatively and/or additionally, the confirmation signal processing module 910 may suppress transmission of the confirmation signal for acknowledging the first multicast/broadcast data when the decoding determining module 916 determines no desire for decoding the first multicast/broadcast data at the indicated first transmission scheme. The confirmation signal processing module 910 may also suppress transmission of the at least one confirmation signal for acknowledging the second multicast/broadcast data when the decoding determining module 916 determines no desire for decoding the second multicast/broadcast data at the indicated second transmission scheme.

The apparatus may include additional modules that perform each of the steps of the algorithm in the aforementioned flow charts of FIGS. 7-8. As such, each step in the aforementioned flow charts of FIGS. 7-8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
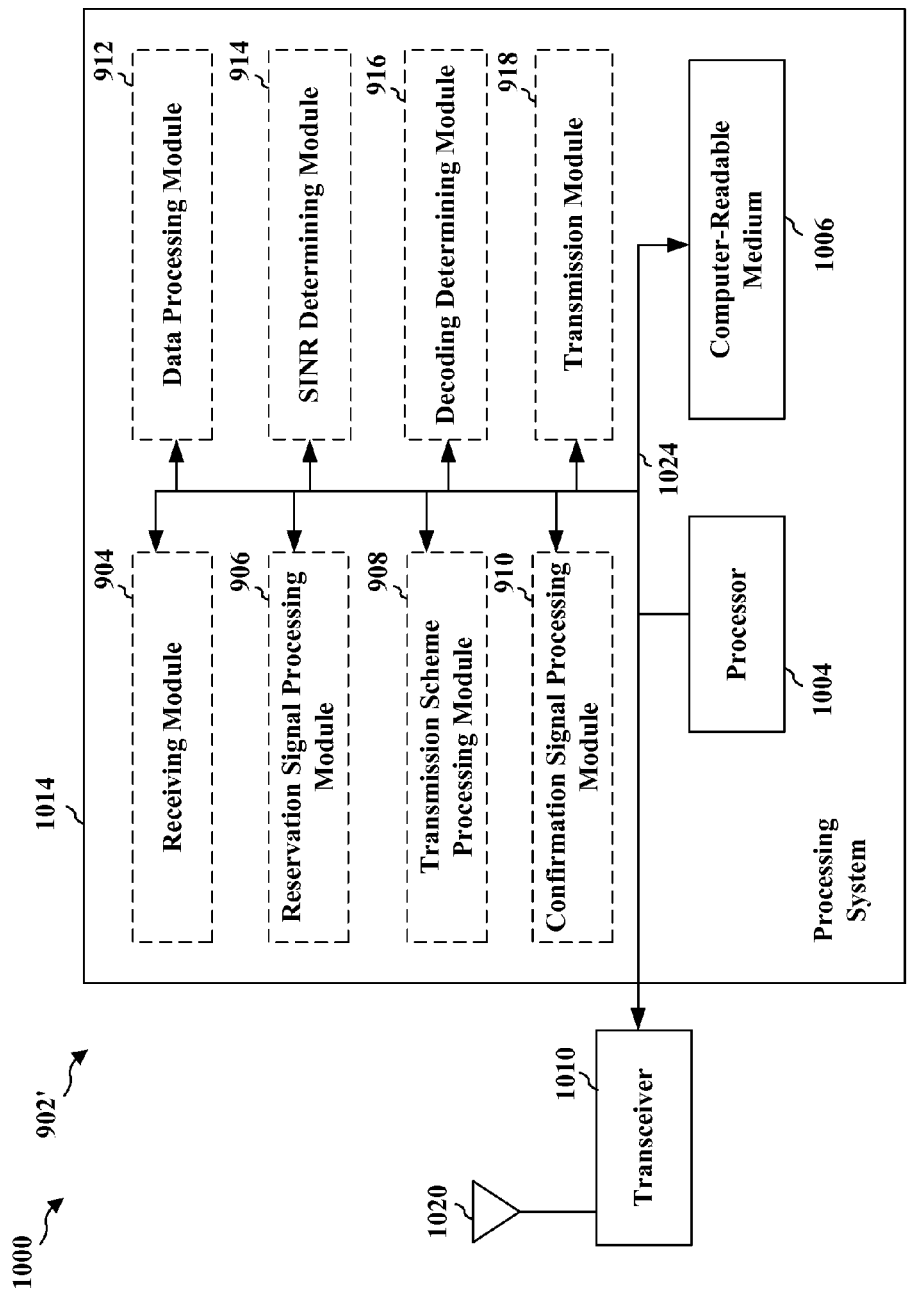
FIG. 10 is a diagram illustrating an example of a hardware implementation for an apparatus employing a processing system, according to one embodiment.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, 914, 916, 918 and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, 910, 912, 914, 916, and 918. In an embodiment, the transceiver 1010 may include the receiving module 904 and the transmission module 918. Accordingly, upon receipt of a wireless signal, the transceiver 1010 may implement the receiving module 904 to decode and/or demodulate the received signal into a form suitable for processing by the various modules of the processing system 1014. The transceiver 1010 may also implement the transmission module 918 to code and/or modulate data produced by the various modules of the processing system 1014 into a form suitable for wireless transmission. The modules may be software modules running in the processor 1004, resident/stored in the computer readable medium 1006, one or more hardware modules coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for receiving indication of a transmission scheme for decoding multicast/broadcast data transmitted from a sender, means for receiving a reservation signal for the multicast/broadcast data from the sender, means for determining whether the apparatus is capable of decoding the multicast/broadcast data at the indicated transmission scheme, means for transmitting a confirmation signal for the multicast/broadcast data to the sender after determining that the apparatus is capable of decoding the multicast/broadcast data at the indicated transmission scheme, means for suppressing transmission of the confirmation signal when it is determined that the apparatus is not capable of decoding the multicast/broadcast data at the indicated transmission scheme, means for receiving the multicast/broadcast data according to the transmission scheme when the confirmation signal is transmitted, means for receiving a first indication of a first transmission scheme for decoding first multicast/broadcast data transmitted from a first sender, wherein the apparatus within a first predetermined region of the first sender is capable of decoding the multicast/broadcast data at the first transmission scheme, means for receiving a second indication of a second transmission scheme for decoding second multicast/broadcast data transmitted from a second sender, wherein the apparatus within a second predetermined region of the second sender is capable of decoding the multicast/broadcast data at the second transmission scheme, wherein the first predetermined region overlaps with the second predetermined region, means for receiving a first reservation signal for the first multicast/broadcast data from the first sender, means for receiving a second reservation signal for the second multicast/broadcast data from the second sender, means for determining a first signal-to-interference-plus-noise ratio (SINR) based on the indicated first transmission scheme, means for determining a second SINR based on the indicated second transmission scheme, means for comparing the first SINR to the second SINR and determining a desire for decoding the first multicast/broadcast data at the first indicated transmission scheme or the second multicast/broadcast data at the second indicated transmission scheme based on the comparison, means for transmitting at least one confirmation signal for at least one of the first multicast/broadcast data to the first sender or the second multicast/broadcast data to the second sender when the desire for decoding the first multicast/broadcast data or the second multicast/broadcast data is determined, means for receiving at least one of the first multicast/broadcast data according to the first indicated transmission scheme or the second multicast/broadcast data according to the second indicated transmission scheme when the at least one confirmation signal is transmitted, means for suppressing transmission of the at least one confirmation signal for the first multicast/broadcast data when it is determined that the apparatus does not desire decoding the first multicast/broadcast data at the indicated first transmission scheme, and means for suppressing transmission of the at least one confirmation signal for the second multicast/broadcast data when it is determined that the apparatus does not desire decoding the second multicast/broadcast data at the indicated second transmission scheme.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a receiver, comprising:
    receiving indication of a transmission scheme for decoding multicast/broadcast data transmitted from a sender;
    receiving a reservation signal for the multicast/broadcast data from the sender;
    determining whether the receiver is capable of decoding the multicast/broadcast data at the indicated transmission scheme, the determining comprising determining whether a path loss between the sender and the receiver supports the indicated transmission scheme; and transmitting a confirmation signal for the multicast/broadcast data to the sender after determining that the receiver is capable of decoding the multicast/broadcast data at the indicated transmission scheme.

2. The method of claim 1, wherein the transmission scheme comprises at least one of a transmission rate, a transmission power, a modulation scheme, or a coding scheme.

3. The method of claim 1, wherein the indication is transmitted via a packet, implied by a resource tone-symbol, previously communicated to the receiver, or included in the reservation signal.

4. The method of claim 1, wherein the indication is at least one of:

provided to the receiver on a slow-time scale; or valid for one or more reservation signals.

5. The method of claim 1, wherein the reservation signal is received according to a transmission scheme different from the indicated transmission scheme.

6. The method of claim 1, further comprising suppressing transmission of the confirmation signal after determining that the receiver is not capable of decoding the multicast/broadcast data at the indicated transmission scheme.

7. The method of claim 1, further comprising receiving the multicast/broadcast data according to the transmission scheme after the confirmation signal is transmitted.

8. The method of claim 1, wherein:

the receiving the indication comprises:

receiving a first indication of a first transmission scheme for decoding first multicast/broadcast data transmitted from a first sender, wherein the receiver within a first predetermined region of the first sender is capable of decoding the multicast/broadcast data at the first transmission scheme, and receiving a second indication of a second transmission scheme for decoding second multicast/broadcast data transmitted from a second sender, wherein the receiver within a second predetermined region of the second sender is capable of decoding the multicast/broadcast data at the second transmission scheme, wherein the first predetermined region overlaps with the second predetermined region;

the receiving the reservation signal comprises:

receiving a first reservation signal for the first multicast/broadcast data from the first sender, and receiving a second reservation signal for the second multicast/broadcast data from the second sender;

the determining whether the receiver is capable of decoding comprises:

determining a first signal-to-interference-plus-noise ratio (SINR) based on the indicated first transmission scheme, determining a second SINR based on the indicated second transmission scheme, and comparing the first SINR to the second SINR and determining a desire for decoding the first multicast/broadcast data at the first indicated transmission scheme or the second multicast/broadcast data at the second indicated transmission scheme based on the comparison; and the transmitting the confirmation signal comprises transmitting at least one confirmation signal for at least one of the first multicast/broadcast data to the first sender or the second multicast/broadcast data to the second sender after determining that the receiver desires decoding the first multicast/broadcast data or the second multicast/broadcast data, the method further comprising at least one of:

suppressing transmission of the at least one confirmation signal for the first multicast/broadcast data after determining that the receiver does not desire decoding the first multicast/broadcast data at the indicated first transmission scheme, or suppressing transmission of the at least one confirmation signal for the second multicast/broadcast data after determining that the receiver does not desire decoding the second multicast/broadcast data at the indicated second transmission scheme.

9. An apparatus for wireless communication, comprising:

means for receiving indication of a transmission scheme for decoding multicast/broadcast data transmitted from a sender;

means for receiving a reservation signal for the multicast/broadcast data from the sender;

means for determining whether the apparatus is capable of decoding the multicast/broadcast data at the indicated transmission scheme by determining whether a pathloss between the sender and the apparatus supports the indicated transmission scheme; and means for transmitting a confirmation signal for the multicast/broadcast data to the sender, wherein the confirmation signal is transmitted after the means for determining determines that the apparatus is capable of decoding the multicast/broadcast data at the indicated transmission scheme.

10. The apparatus of claim 9, wherein the transmission scheme comprises at least one of a transmission rate, a transmission power, a modulation scheme, or a coding scheme.

11. The apparatus of claim 9, wherein the indication is transmitted via a packet, implied by a resource tone-symbol, previously communicated to the apparatus, or included in the reservation signal.

12. The apparatus of claim 9, wherein the indication is at least one of:

provided to the apparatus on a slow-time scale; or valid for one or more reservation signals.

13. The apparatus of claim 9, wherein the reservation signal is received according to a transmission scheme different from the indicated transmission scheme.

14. The apparatus of claim 9, further comprising means for suppressing transmission of the confirmation signal, wherein the transmission is suppressed after the means for determining determines that the apparatus is not capable of decoding the multicast/broadcast data at the indicated transmission scheme.

15. The apparatus of claim 9, further comprising means for receiving the multicast/broadcast data according to the transmission scheme after the confirmation signal is transmitted.

16. The apparatus of claim 9, wherein:

the means for receiving the indication is configured to:

receive a first indication of a first transmission scheme for decoding first multicast/broadcast data transmitted from a first sender, wherein the apparatus within a first predetermined region of the first sender is capable of decoding the multicast/broadcast data at the first transmission scheme, and receive a second indication of a second transmission scheme for decoding second multicast/broadcast data transmitted from a second sender, wherein the apparatus within a second predetermined region of the second sender is capable of decoding the multicast/broadcast data at the second transmission scheme,
wherein the first predetermined region overlaps with the second predetermined region;
the means for receiving the reservation signal is configured to:
receive a first reservation signal for the first multicast/broadcast data from the first sender, and
receive a second reservation signal for the second multicast/broadcast data from the second sender;
the means for determining whether the apparatus is capable of decoding is configured to:
determine a first signal-to-interference-plus-noise ratio (SINR) based on the indicated first transmission scheme,
determine a second SINR based on the indicated second transmission scheme, and
compare the first SINR to the second SINR and determine a desire for decoding the first multicast/broadcast data at the first indicated transmission scheme or the second multicast/broadcast data at the second indicated transmission scheme based on the comparison; and
the means for transmitting the confirmation signal is configured to transmit at least one confirmation signal for at least one of the first multicast/broadcast data to the first sender or the second multicast/broadcast data to the second sender after the means for determining determines that the apparatus desires decoding the first multicast/broadcast data or the second multicast/broadcast data,
the apparatus further comprising at least one of:
means for suppressing transmission of the at least one confirmation signal for the first multicast/broadcast data, wherein the transmission is suppressed after the means for determining determines that the apparatus does not desire decoding the first multicast/broadcast data at the indicated first transmission scheme; or
means for suppressing transmission of the at least one confirmation signal for the second multicast/broadcast data, wherein the transmission is suppressed after the means for determining determines that the apparatus does not desire decoding the second multicast/broadcast data at the indicated second transmission scheme.

17. An apparatus for wireless communication, comprising:
a memory; and
at least one processor coupled to the memory and configured to:
receive indication of a transmission scheme for decoding multicast/broadcast data transmitted from a sender;
receive a reservation signal for the multicast/broadcast data from the sender;
determine whether the apparatus is capable of decoding the multicast/broadcast data at the indicated transmission scheme, the at least one processor configured to determine by determining whether a pathloss between the sender and the apparatus supports the indicated transmission scheme; and
transmit a confirmation signal for the multicast/broadcast data to the sender after the at least one processor determines that the apparatus is capable of decoding the multicast/broadcast data at the indicated transmission scheme.

18. The apparatus of claim 17, wherein the transmission scheme comprises at least one of a transmission rate, a transmission power, a modulation scheme, or a coding scheme.

19. The apparatus of claim 17, wherein the indication is transmitted via a packet, implied by a resource tone-symbol, previously communicated to the apparatus, or included in the reservation signal.

20. The apparatus of claim 17, wherein the indication is at least one of:
provided to the apparatus on a slow-time scale; or
valid for one or more reservation signals.

21. The apparatus of claim 17, wherein the reservation signal is received according to a transmission scheme different from the indicated transmission scheme.

22. The apparatus of claim 17, wherein the at least one processor is further configured to suppress transmission of the confirmation signal after the at least one processor determines that the apparatus is not capable of decoding the multicast/broadcast data at the indicated transmission scheme.

23. The apparatus of claim 17, wherein the at least one processor is further configured to receive the multicast/broadcast data according to the transmission scheme after the confirmation signal is transmitted.

24. The apparatus of claim 17, wherein:
the at least one processor configured to receive the indication is further configured to receive a first indication of a first transmission scheme for decoding first multicast/broadcast data transmitted from a first sender, wherein the apparatus within a first predetermined region of the first sender is capable of decoding the multicast/broadcast data at the first transmission scheme;
the at least one processor configured to receive the indication is further configured to receive a second indication of a second transmission scheme for decoding second multicast/broadcast data transmitted from a second sender, wherein the apparatus within a second predetermined region of the second sender is capable of decoding the multicast/broadcast data at the second transmission scheme,
wherein the first predetermined region overlaps with the second predetermined region;
the at least one processor configured to receive the reservation signal is further configured to receive a first reservation signal for the first multicast/broadcast data from the first sender; and
the at least one processor configured to receive the reservation signal is further configured to receive a second reservation signal for the second multicast/broadcast data from the second sender;
the at least one processor further configured to:
determine a first signal-to-interference-plus-noise ratio (SINR) based on the indicated first transmission scheme,
determine a second SINR based on the indicated second transmission scheme, and
compare the first SINR to the second SINR and determine a desire for decoding the first multicast/broadcast data at the first indicated transmission scheme or the second multicast/broadcast data at the second indicated transmission scheme based on the comparison,
wherein the at least one processor configured to transmit the confirmation signal is further configured to at least one of:
transmit at least one confirmation signal for at least one of the first multicast/broadcast data to the first sender or the second multicast/broadcast data to the second sender after the at least one processor determines that the apparatus desires decoding the first multicast/broadcast data or the second multicast/broadcast data, suppress transmission of the at least one confirmation signal for the first multicast/broadcast data after the at least one processor determines that the apparatus does not desire decoding the first multicast/broadcast data at the indicated first transmission scheme, or suppress transmission of the at least one confirmation signal for the second multicast/broadcast data after the at least one processor determines that the apparatus does not desire decoding the second multicast/broadcast data at the indicated second transmission scheme.

25. A computer program product for a receiver, comprising:
a non-transitory computer-readable medium comprising code for:
receiving indication of a transmission scheme for decoding multicast/broadcast data transmitted from a sender;
receiving a reservation signal for the multicast/broadcast data from the sender;
determining whether the receiver is capable of decoding the multicast/broadcast data at the indicated transmission scheme, the determining comprising determining whether a path loss between the sender and the receiver supports the indicated transmission scheme; and
transmitting a confirmation signal for the multicast/broadcast data to the sender after determining that the receiver is capable of decoding the multicast/broadcast data at the indicated transmission scheme.

26. The computer program product of claim 25, wherein the transmission scheme comprises at least one of a transmission rate, a transmission power, a modulation scheme, or a coding scheme.

27. The computer program product of claim 25, wherein the indication is transmitted via a packet, implied by a resource tone-symbol, previously communicated to the receiver, or included in the reservation signal.

28. The computer program product of claim 25, wherein the indication is at least one of:
provided to the receiver on a slow-time scale; or
valid for one or more reservation signals.

29. The computer program product of claim 25, wherein the reservation signal is received according to a transmission scheme different from the indicated transmission scheme.

30. The computer program product of claim 25, the non-transitory computer-readable medium further comprising code for suppressing transmission of the confirmation signal after determining that the receiver is not capable of decoding the multicast/broadcast data at the indicated transmission scheme.

31. The computer program product of claim 25, the non-transitory computer-readable medium further comprising code for receiving the multicast/broadcast data according to the transmission scheme after the confirmation signal is transmitted.

32. The computer program product of claim 5, wherein:
the non-transitory computer-readable medium comprising code for receiving the indication is configured to:
receive a first indication of a first transmission scheme for decoding first multicast/broadcast data transmitted from a first sender, wherein the receiver within a first predetermined region of the first sender is capable of decoding the multicast/broadcast data at the first transmission scheme
receive a second indication of a second transmission scheme for decoding second multicast/broadcast data transmitted from a second sender, wherein the receiver within a second predetermined region of the second sender is capable of decoding the multicast/broadcast data at the second transmission scheme,
wherein the first predetermined region overlaps with the second predetermined region;
the non-transitory computer-readable medium comprising code for receiving the reservation signal is configured to:
receive a first reservation signal for the first multicast/broadcast data from the first sender, and
receive a second reservation signal for the second multicast/broadcast data from the second sender;
the non-transitory computer-readable medium comprising code for determining whether the receiver is capable of decoding is configured to:
determine a first signal-to-interference-plus-noise ratio (SINR) based on the indicated first transmission scheme,
determine a second SINR based on the indicated second transmission scheme, and
compare the first SINR to the second SINR and determine a desire for decoding the first multicast/broadcast data at the first indicated transmission scheme or the second multicast/broadcast data at the second indicated transmission scheme based on the comparison;
the non-transitory computer-readable medium comprising code for transmitting the confirmation signal is configured to:
transmit at least one confirmation signal for at least one of the first multicast/broadcast data to the first sender or the second multicast/broadcast data to the second sender after determining that the receiver desires decoding the first multicast/broadcast data or the second multicast/broadcast data; and
the non-transitory computer-readable medium further comprising code for at least one of:
suppressing transmission of the at least one confirmation signal for the first multicast/broadcast data after determining that the receiver does not desire decoding the first multicast/broadcast data at the indicated first transmission scheme, or
suppressing transmission of the at least one confirmation signal for the second multicast/broadcast data after determining that the receiver does not desire decoding the second multicast/broadcast data at the indicated second transmission scheme.

* * * * *